S. GREACEN.
Eye-Glasses.

No. 140,912.  Patented July 15, 1873.

Witnesses:  Inventor:
Jno. Rathersp  Stanley Greacen

UNITED STATES PATENT OFFICE.

STANLEY GREACEN, OF RYE, NEW YORK.

IMPROVEMENT IN EYE-GLASSES.

Specification forming part of Letters Patent No. 140,912, dated July 15, 1873; application filed February 7, 1872.

*To all whom it may concern:*

Be it known that I, STANLEY GREACEN, of Rye, Westchester county and State of New York, have invented a new and useful Improvement in the manner of adjusting Eye-Glasses; and I do hereby declare that the following is a full and exact specification of the same, reference being had to the accompanying drawing and to the letters of reference marked thereon making a part of this specification.

The object of this invention is to provide a means by which eye-glasses may be more securely held in position while in use, and, at the same time, be so constructed that the spring by which this object is effected is not only of a simpler and cheaper description than those heretofore in use, but very much more durable. My invention consists in providing the arms of ordinary pivoted eye-glasses with shoulders placed at or near the pivot, and so arranged that, as the said glasses are opened, the distance between these shoulders is constantly decreased, and any elastic substance, being placed between them, and being compressed by such decreasing distance, will act as a spring to prevent such opening, and thus, by a simple and effective device, give the requisite force to hold the glasses in place upon the nose.

Figure 1:
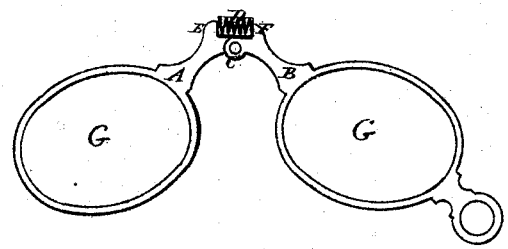
Figure 2:
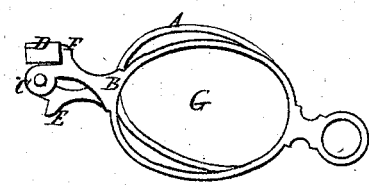

In the accompanying drawing, Figure 1 represents a front view of a pair of eye-glasses with my invention applied, open for use. Fig. 2 represents the same when closed.

Similar letters of reference indicate corresponding parts in the drawings.

I will now proceed to more particularly describe the same.

Figure 3:
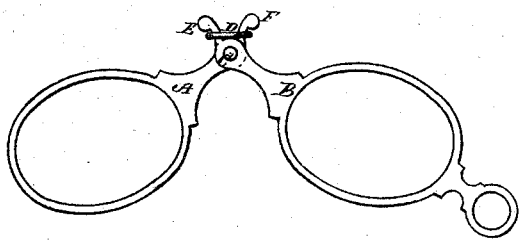
Figure 4:
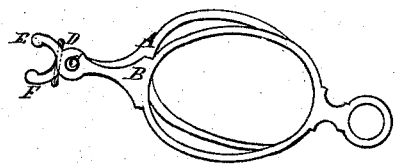

In the drawing, Fig. 1, G G are the glasses; A B, frames pivoted together at C, and provided with the shoulders E and F. Now it is obvious that, as the glasses are opened, the shoulders E and F will be brought nearer and nearer together until the spring D is acted upon, and thus produce the desired result. These shoulders can be made very small, and, by the use of suitable spring, can be so diminished in size as to be almost invisible, or they can be entirely covered with a small cap held in place by the pivot C, and thus do away with any objection to my invention on account of clumsiness of appearance. By a slight change in the formation of the shoulders they can be made to recede, the one from the other, when a spring of tension can be used, as shown in Figs. 3 and 4.

Having thus described my invention, what I claim as new, and desire to secure by Letters Patent, is—

1. The combination, with a pair of eye-glasses, of an elastic cushion arranged as a compression-spring to keep the glasses in position when in use, substantially as herein described.

2. The combination, with eye-glass frames, of arms or shoulders extending beyond the connecting-pivot, substantially as shown and described, to receive the spring which holds the glasses in position when in use.

STANLEY GREACEN.

Witnesses:
JNO. RATHORP,
E. J. GREACEN.